US006681654B2

(12) United States Patent
Zentmyer

(10) Patent No.: US 6,681,654 B2
(45) Date of Patent: Jan. 27, 2004

(54) LOCKED DIFFERENTIAL IMPROVEMENTS

(75) Inventor: John Hobart Zentmyer, Gilles Plains (AU)

(73) Assignee: 4WD Equipment SA PTY Ltd., South Australia (AU)

( * ) Notice: Subject to any disclaimer, the term of this patent is extended or adjusted under 35 U.S.C. 154(b) by 112 days.

(21) Appl. No.: 10/054,997

(22) Filed: Jan. 25, 2002

(65) Prior Publication Data

US 2002/0151402 A1 Oct. 17, 2002

Related U.S. Application Data

(60) Provisional application No. 60/264,061, filed on Jan. 26, 2001.

(51) Int. Cl.$^7$ ................................................ F16A 48/12
(52) U.S. Cl. ......................................................... 74/650
(58) Field of Search ........................................... 74/650

(56) References Cited

U.S. PATENT DOCUMENTS

| 2,555,044 A | * | 5/1951 | Lewis ........................... 74/650 |
| 4,498,355 A | | 2/1985 | Schou ........................... 74/650 |
| 4,943,269 A | | 7/1990 | Smith ........................... 475/231 |
| 5,171,192 A | | 12/1992 | Schlosser et al. ............ 475/237 |
| 5,350,340 A | | 9/1994 | Paul et al. ................... 475/237 |
| 5,413,015 A | | 5/1995 | Zentmyer ..................... 74/650 |
| 5,461,941 A | | 10/1995 | Young .......................... 74/650 |
| 5,591,098 A | | 1/1997 | Jones et al. ................. 475/231 |
| 5,603,246 A | | 2/1997 | Zentmyer ..................... 74/650 |
| 5,637,049 A | | 6/1997 | Zentmyer et al. ........... 475/231 |
| 5,715,733 A | | 2/1998 | Dissett ......................... 74/650 |
| 5,816,971 A | | 10/1998 | Zentmyer et al. ............. 475/84 |
| 5,836,220 A | * | 11/1998 | Valente ........................ 74/650 |
| 5,947,859 A | | 9/1999 | McNamara ................... 475/237 |
| 6,007,449 A | | 12/1999 | Okada et al. ................ 475/231 |

* cited by examiner

*Primary Examiner*—Dirk Wright
(74) *Attorney, Agent, or Firm*—Finnegan, Henderson, Farabow, Garrett & Dunner LLP

(57) ABSTRACT

A locked differential for motor vehicles including, for each of oppositely positioned axles for wheels of a vehicle, an axle coupler, and a driver, each being co-axially aligned with a respective axle, a plurality of teeth on each respective axle, a plurality of teeth on respective mutually facing faces of each respective coupler and driver for effecting an interlocking drive coupling therebetween, a transverse driving shaft extending between the respective drivers and arranged to effect rotation drive against the respective drivers, a resilient device extending between the drivers to urge these apart and toward an interlocking engagement with their respective couplers, and a device providing a camming interrelationship between the respective drivers such that, with relative rotation between the two drivers, the effect, at least as a result from one respective relative direction, will result in the two drivers being urged toward each other against the opposite pressure of the resilient device so as to release at least one of the drivers from a driving coupling through the mutually engaging teeth with at least one of the axle couplers.

9 Claims, 6 Drawing Sheets

LOCKED DIFFERENTIAL IMPROVEMENTS

CROSS REFERENCE TO RELATED APPLICATIONS

This application claims the benefit of U.S. Provisional Application No. 60/264,061, filed Jan. 26, 2001, the contents of which are incorporated herein by reference.

This invention relates to locked differentials for vehicles.

It is now known to provide for vehicle differential lockers where there is a co-axial arrangement of two drivers, two axle couplers and means to effect, subject to differential rotational forces provided by respective left and right axles, a locking or unlocking effect by such members.

This invention relates to improvements in such arrangements.

At least one objective is to provide an arrangement providing for this effect which can be manufactured more economically than devices of past design.

Further, however, the improvement offers the public a very useful alternative to those designs currently existing.

In one form of this invention, although this need not necessarily be the only or indeed the broadest form of this, there is proposed a locked differentials for motor vehicles including, for each of oppositely positioned axles for wheels of a vehicle, an axle coupler, and a driver each being co-axially aligned with a respective axle, a plurality of teeth on each respective axle, a plurality of teeth on respective mutually facing faces of each respective coupler and driver for effecting an interlocking drive coupling therebetween, a transverse driving shaft extending between the respective drivers and arranged to effect rotational drive against the respective drivers, resilient means extending between the drivers to urge these apart and toward an interlocking engagement with their respective couplers, and a means providing a camming interrelationship between the respective drivers such that, with relative rotation between the two drivers, the effect, at least as a result from one respective relative direction, will result in the two drivers being urged toward each other against the opposite pressure of the resilient means so as to release at least one of the drivers from a driving coupling through the mutually engaging teeth with at least one of the axle couplers.

In preference, the means providing the camming interrelationship includes a member secured to one of the drivers interengaging with the other of the drivers.

In further preference, the means providing the camming interrelationship includes a tab secured to a first of the drivers and having a portion located within a cavity of the second of the drivers.

In preference such cavity is a slot in a side of the second driver.

In preference, the cavity is a slot having inclined facing edges with the tab having matching inclined edges such that the respective edges provide for an interengaging of the respective edges to provide for the camming effect.

In preference, the tab is positioned so as to effect a limit to an extent of relative rotational freedom of a one of the drivers to the other.

In preference, the teeth on mutually facing faces of the drivers and axle couplers are each shaped so that each side surface of each tooth is perpendicular to the plane of rotation. However angles other than perpendicular may be chosen.

In preference, the resilient means comprise at least one helical spring extending between the respective drivers.

In preference, each of the drivers has at least two tabs secured at diametrically opposite positions, each being releasably secured to a first of the drivers and having outwardly inclined edges located within a slot within a side of a second of the drivers.

In a further form of this invention, it can be said to reside in an assembly of a differential for a motor vehicle which includes a locking differential as previously characterized.

These and other features of the invention will now be better understood when described with the relation to a preferred embodiment which shall be described with the assistance of drawings wherein.

Figure 1:
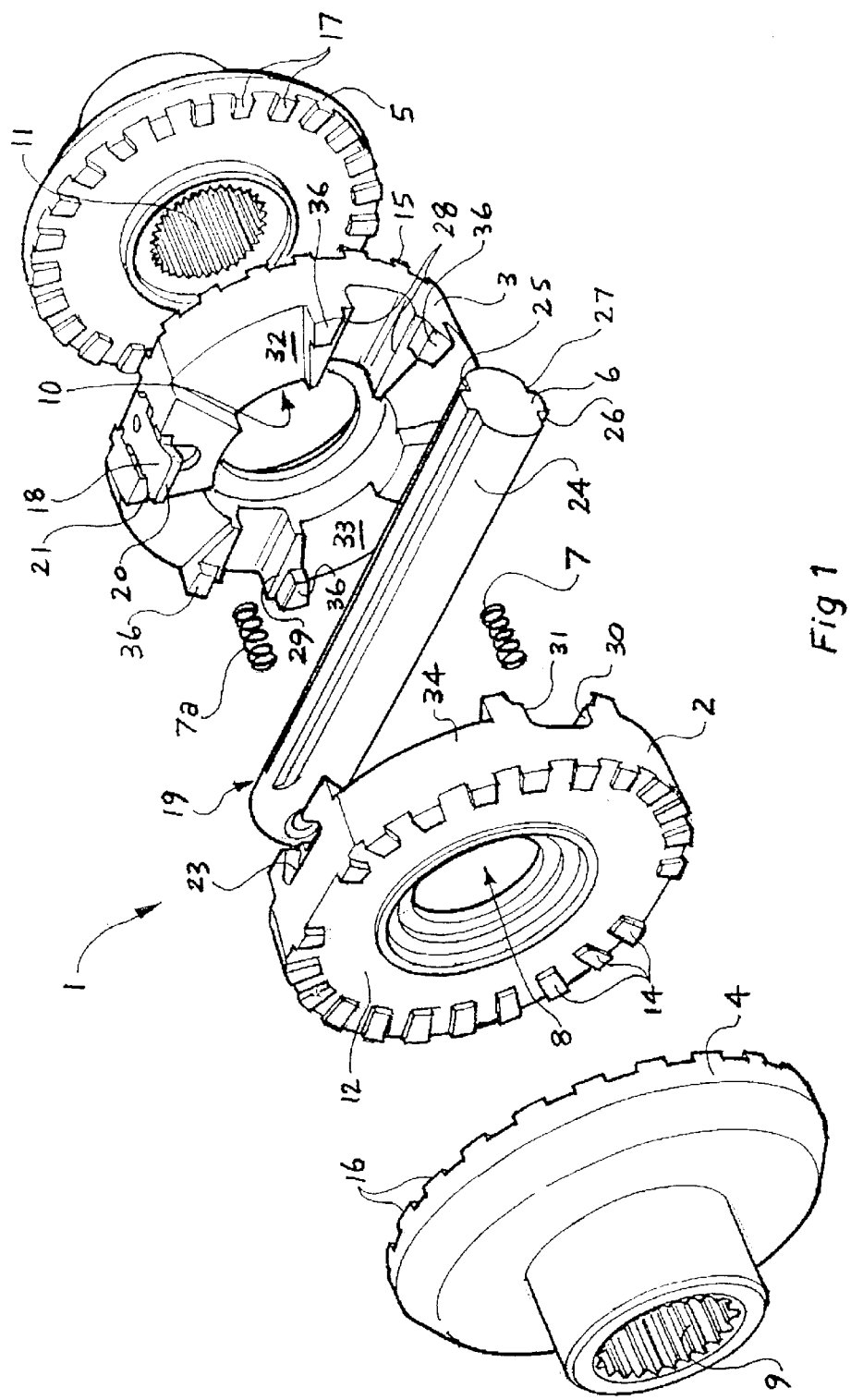
FIG. 1 is an exploded view of the parts which together make up the differential locker according to the embodiment.
Figure 2:
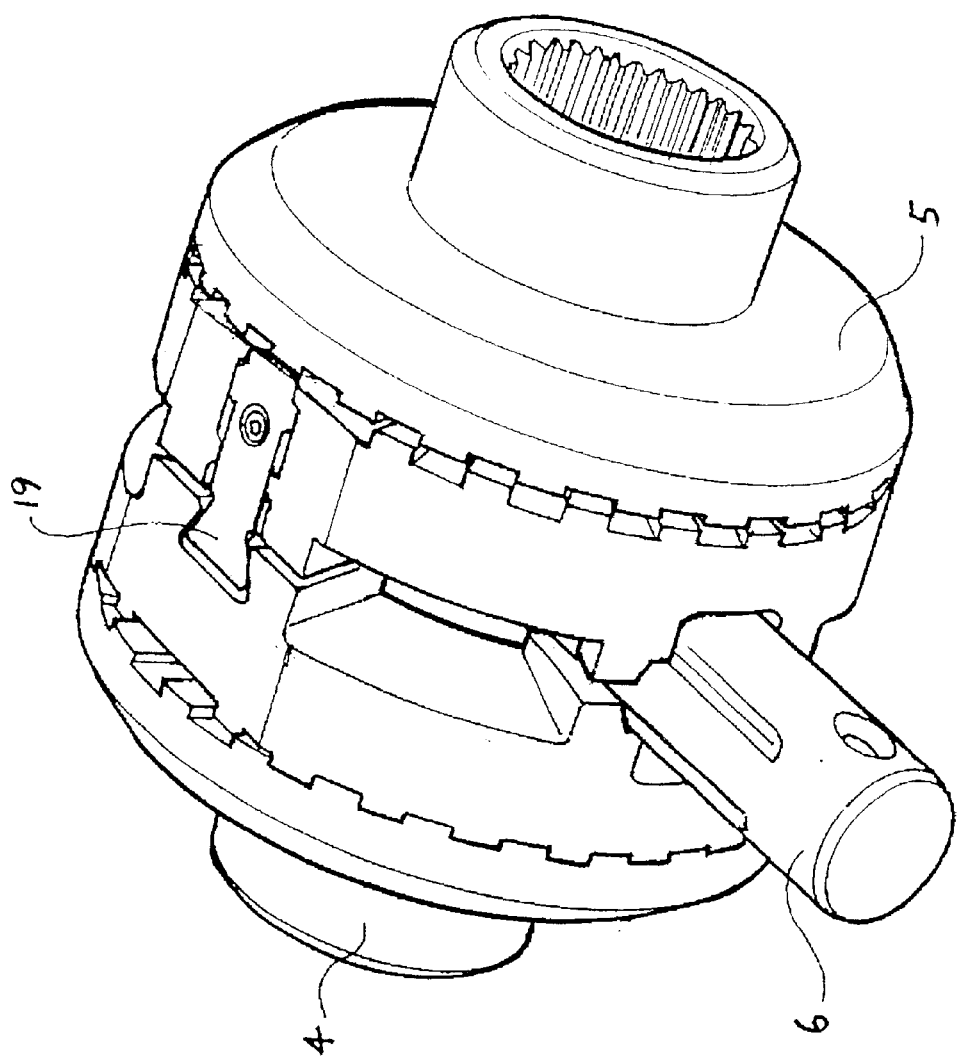
FIG. 2 is a perspective view of the differential locker according to the same embodiment as in FIG. 1 when assembled and in an operating position with, however, the left hand driving coupler being disengaged from its respective driver.
Figure 3:
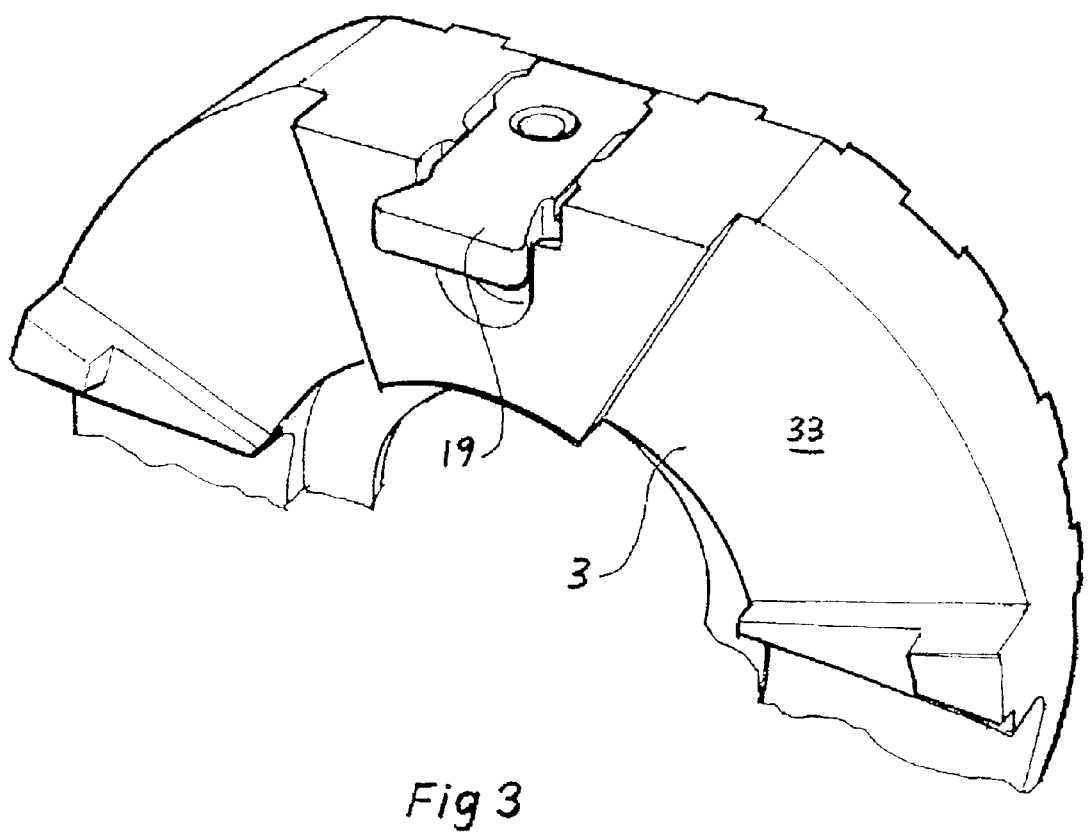
Figure 4:
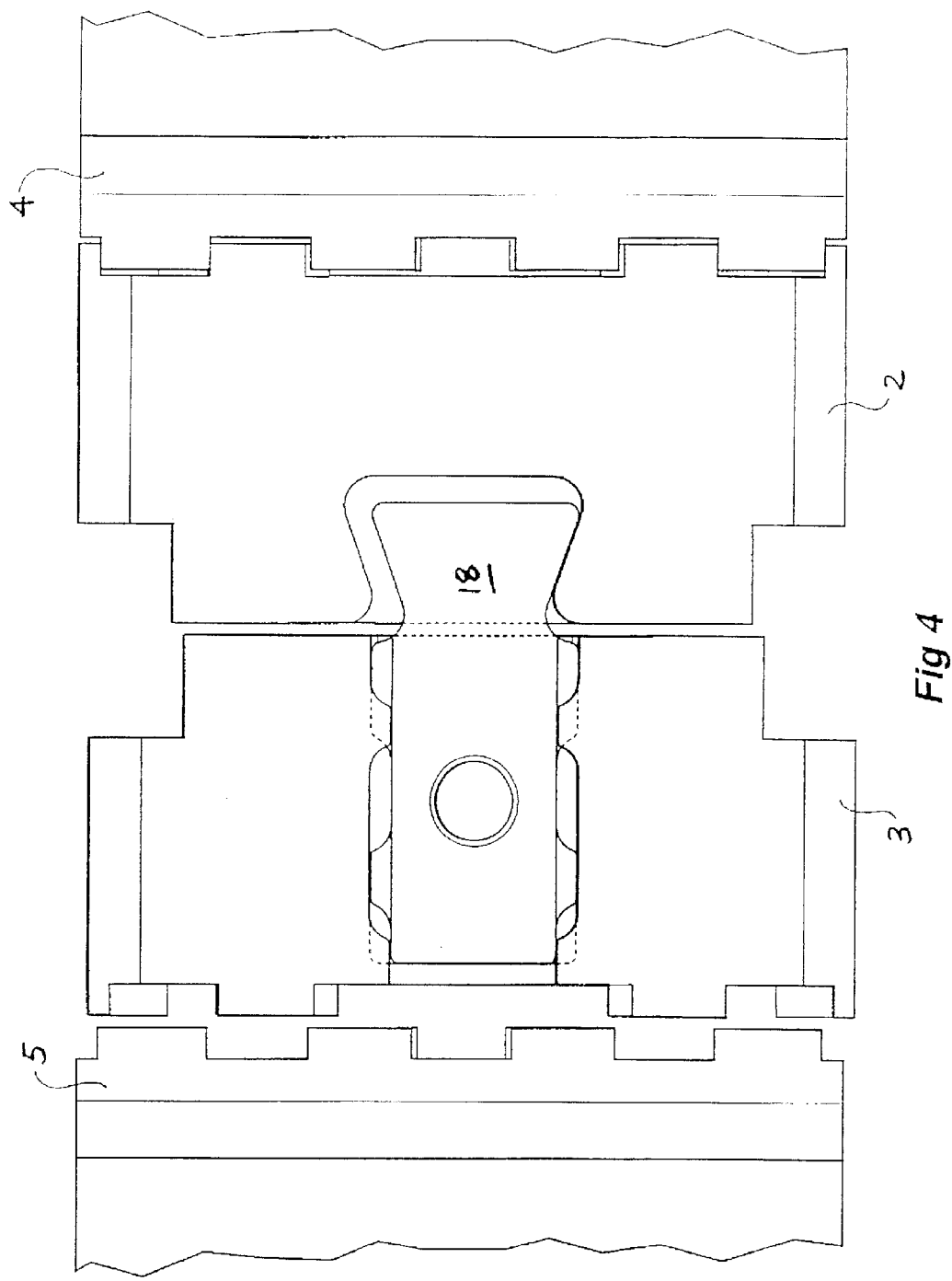
Figure 5:
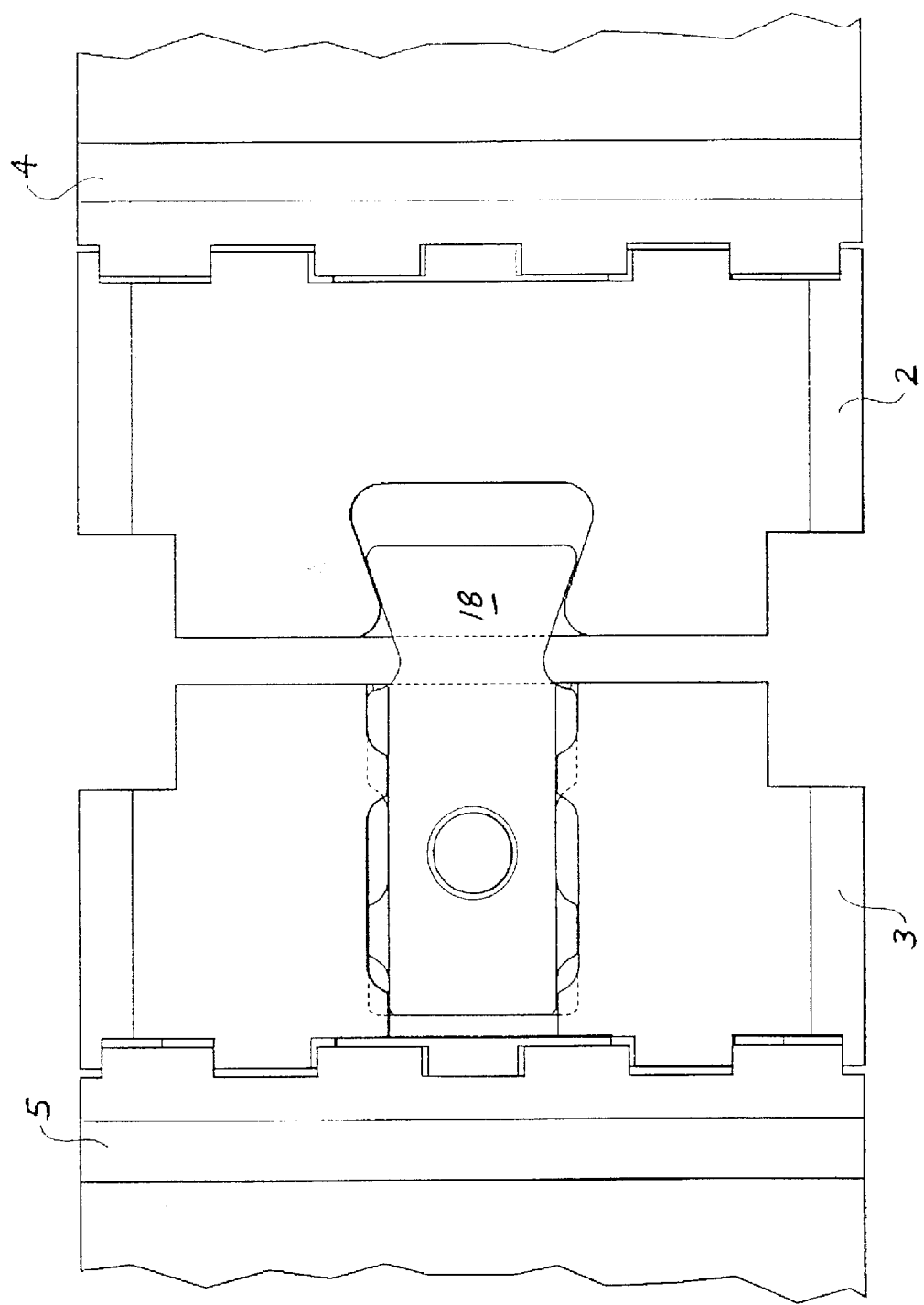
Figure 6:
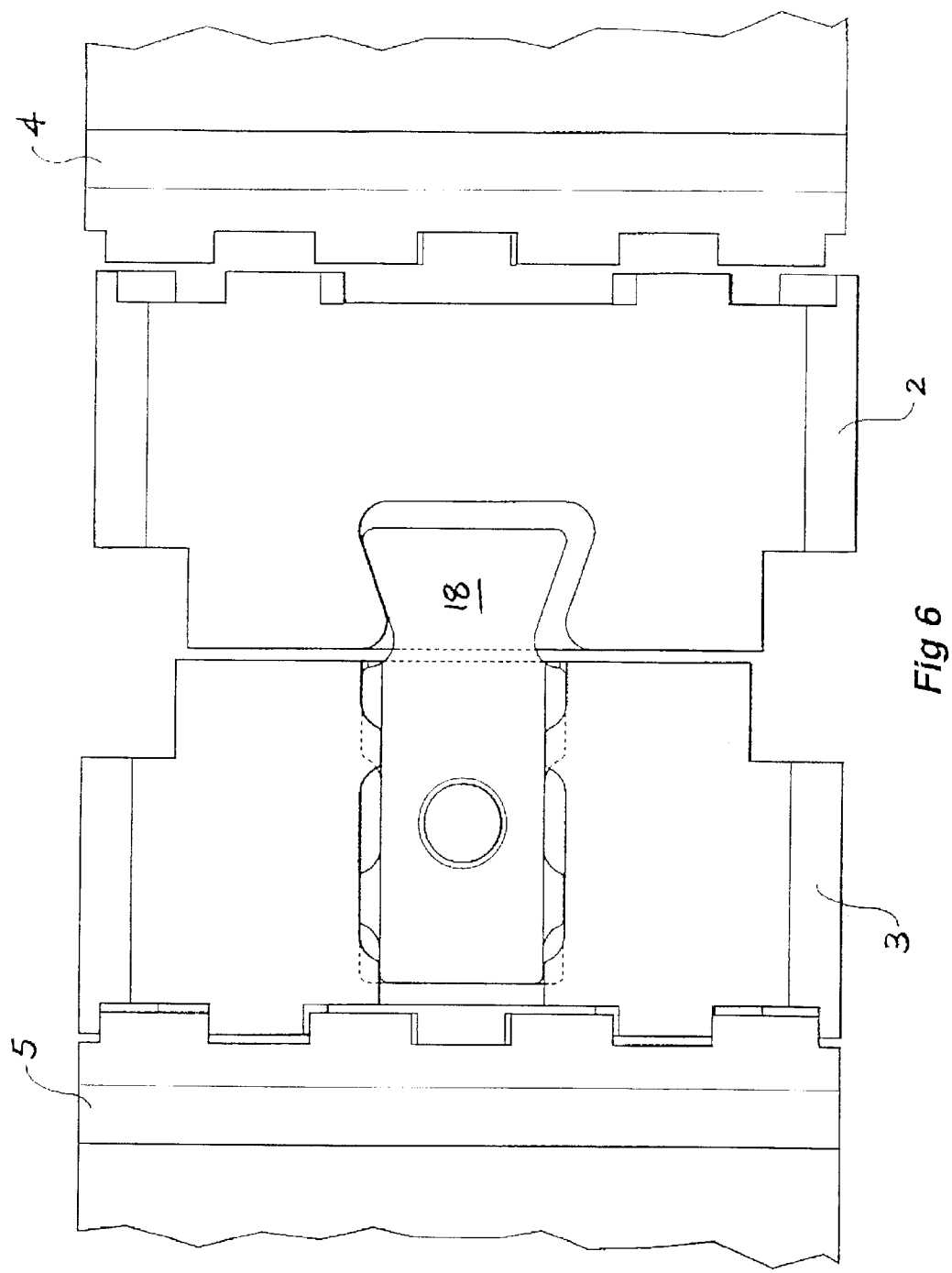

FIG. 3 is an enlarged view of a portion of one of the drivers carrying with it the tab, FIG. 4 is a side elevation of the drivers showing the interrelationship of the tab between the drivers, and showing the drive axle couplers at each end in one case in an engaging position, and in another, a disengaged position additionally showing the tab bring inserted and the locking pinion a tab hole relationship, FIG. 5 shows the differential locker in the neutral position with both drives locked, and FIG. 6 shows the differential locker with the second drive released.

Referring in detail to the drawings, the differential locker 1 is installable into an existing differential case generally with no modifications.

There are accordingly two drivers 2 and 3 and two axle couplers 4 and 5, a pinion shaft 6 and helical springs 7 and 7(a).

Each of the drivers 2 and 3, and the axle couplers 4 and 5 are arranged to be co-axially aligned by reason of having appropriate located central apertures such as at 8 and 9 and 10 and 11.

Each of the respective drivers 2 and 3 has an outwardly facing face shown 12 and 13 which have a plurality of teeth at typically 14 and 15 which are intended to be arranged to mutually engage with respective axle couplers 4 and 5.

The axle couplers 4 and 5 have mutually engaging teeth at 16 and 17.

There are means to provide a camming interrelationship between the respective drivers 2 and 3 which in this case includes two diametrically opposite positioned tabs 18 and 19.

These have at an outer end 20 outwardly inclined edges at 21 and 22 which are arranged to engage within a slot 23.

This slot in the opposite driver, in each case, is mutually shaped so as to receive the end 20 of the tab 18 and so that, with relative movement, between the respective drivers, there will be caused by reason of a camming action, a pulling together against the otherwise outward urging of the helical springs 7 and 8, of the drivers 2 and 3.

This effect occurs in the event that one of the axles coupled to one of the axle couplers 4 or 5, drives forwardly relative to the other.

A further feature of the arrangement described is that the pinion shaft 6 includes lateral grooves shown typically at 24 and 25 on one side and 26 and 27 on the other.

Such grooves then provide for lateral faces which engage for driving purposes against mutually positioned surfaces such as at 28 and 29 in respect of driver 3 and shown in respect of driver 2, 30 and 31.

Because this arrangement relies upon a relative camming interrelationship by reason of the tab 18 with a slot 23, it does not therefore rely upon a camming effect that might be achieved by having, for instance, the teeth of the driver and the teeth of an axle coupler having inclined sides.

One preferred embodiment of the design permits the teeth such as at 14, 15, 16 and 17 to have straight sides or perhaps, more accurately stated, sides which are aligned so as to be parallel to an engaging and disengaging direction between the drivers and axle couplers or alternatively perpendicular to the plane of rotation.

This can be described in various ways but it has been found that it is very much more economic to be able to machine teeth having such straight sides and there is also then the advantage of having face to face contact for mutual driving force so that for a given number and size of teeth, a larger horse power can be transmitted between them.

This concept then of having straight or, in other terminology, vertical sides rather than slanted sides, allows for an effectively stronger assembly because all of any incoming torque can be applied directly to rotating the axles, resulting in negligible side loads at all inside the differential case.

Sloping sides, as previously described in relation to other devices, implicitly produce sideways forces that will adversely load a differential case and is to be taken into account for design purposes.

The tabs used in this current design can be manufactured in the form providing a large surface contact area and can be appropriately heat treated. This will also assist in reduction of the potential of any breakage.

In a further feature, simple use of two small helical springs rather than in prior art that may use four to eight smaller springs, permits the use of larger diameter wire in the two springs which reduces stress and increases reliability and also makes for lower cost and easier installation.

Further, a camming angle can be selected which reduces dynamic backlash in this arrangement.

A further advantage arises when axles are used that will require a C-clip axle retention mechanism. By providing large cut outs on the inner sides of the drivers, and these are shown typically at 32, 33 and 34, it is possible during installation to nest the drivers back to back by having these interfit closer and therefore allow enough room for access between the respective axle coupler and the driver and requiring the clip to be carefully slipped through a cut out the driver teeth. If driver teeth are removed to permit this insertion, the strength of the interconnection through the teeth is reduced. With the present invention during disassembly the C-clip can easily be removed.

Each tab, which is shown as being connected to driver 3, may also be connected to the other driver and is held in place by a spring loaded pin. The tab itself, for instance, at 18 or 19 is inserted under flanges on the driver, the spring loaded pin biasing the tab against the flanges so that the respective tabs are firmly held in position. While the tab is shown in the preferred form it is to be realized the tab may take other forms and shapes and need not be connected to the driver shown. Also the invention is not limited to the retaining of the tab in position by a spring loaded pin, but may be retained by other equivalent means.

In operation, the driving teeth of the respective drivers and axle couplers are engaged while a vehicle is moving straight ahead but, when it starts to turn, an outside coupler will begin to rotate faster than an inner one and its driver will also then briefly rotate along with it until the unlocking tabs contact the mutually engaging sides of an unlocking cavity or recess. As the axle coupler then continues to rotate, part of the tab will engage against the mutually inclined side of the cavity or recess so that these are then pulled together, pulling the respective driver inward until the driving teeth clear from the respective axle coupler.

This concept then of effecting a pulling with relative movement rather than has been historically the case of pushing, ends up with significant advantages, in any event.

As the vehicle straightens out then, the outside coupler rotation slows down and approaches that of the driver, then at this point, the engaging cam surfaces 36 in the driver slot or a recess meets the pinion shaft and the driver is cammed back into the coupler teeth for completing the interlocking.

As has been stated previously, this means that we eliminate side loading or at least reduce this significantly. Also the invention results in manufacturing efficiencies and product simplification.

Throughout this specification the purpose has been to illustrate the invention and not to limit this and although one embodiment of the invention has been described the invention is not to be limited thereto but can include variations and modifications falling within the spirit and scope of the invention.

Claims defining the invention are as follows:

1. A locked differentials for motor vehicles including, for each of oppositely positioned axles for wheels of a vehicle, an axle coupler, and a driver, each being co-axially aligned with a respective axle, a plurality of teeth on each respective axle, a plurality of teeth on respective mutually facing faces of each respective coupler and driver for effecting an interlocking drive coupling therebetween, a transverse driving shaft extending between the respective drivers and arranged to effect rotational drive against the respective drivers, resilient means extending between the drivers to urge these apart and toward an interlocking engagement with their respective couplers, and a means providing a camming interrelationship between the respective drivers such that, with relative rotation between the two drivers, the effect, at least as a result from one respective relative direction, will result in the two drivers being urged toward each other against the opposite pressure of the resilient means so as to release at least one of the drivers from a driving coupling through the mutually engaging teeth with at least one of the axle couplers.

2. As defined in claim 1 wherein the camming interrelationship includes a member secured to one of the drivers interengaging with the other of the drivers.

3. As defined in claim 1 wherein the means providing the camming interrelationship includes a tab secured to a first of the drivers and having a portion located within a cavity of the second of the drivers.

4. As defined in claim 1 wherein such cavity is a slot in a side of the second driver.

5. As defined in claim 1 wherein the cavity is a slot having inclined facing edges with the tab having matching inclined edges such that the respective edges provide for an interengaging of the respective edges to provide for the camming effect.

6. As defined in claim 1 wherein the tab is positioned so as to effect a limit to an extent of relative rotational freedom of a one of the drivers to the other.

7. As defined in claim 1 wherein the teeth on mutually facing faces of the drivers and axle couplers are each shaped so that each side surface of each tooth is perpendicular to the plane of rotation.

8. As defined in claim 1 wherein the resilient means comprise at least one helical spring extending between the respective drivers.

9. As defined in claim 1 wherein each of the drivers has at least two tabs secured at diametrically opposite positions, each being releasably secured to a first of the drivers and having outwardly inclined edges located within a slot within a side of a second of the drivers.

* * * * *